United States Patent [19]

Soffer et al.

[11] Patent Number: 4,685,940
[45] Date of Patent: Aug. 11, 1987

[54] SEPARATION DEVICE

[76] Inventors: Abraham Soffer, 38 Moav St., Arad; Jacob E. Koresh, 10 Zeela Street; Shlomo Saggy, 3 Moria Street, both of Beer Sheva, all of Israel

[21] Appl. No.: 760,529

[22] Filed: Jul. 30, 1985

Related U.S. Application Data

[63] Continuation-in-part of Ser. No. 588,745, Mar. 12, 1984, abandoned.

[51] Int. Cl.⁴ ............................................. B01D 53/22
[52] U.S. Cl. ......................................... 55/158; 55/16; 423/447.1; 423/449
[58] Field of Search ................ 55/16, 158; 210/500.2; 423/447.1, 447.2, 447.7, 447.9, 449

[56] References Cited

U.S. PATENT DOCUMENTS

| | | | |
|---|---|---|---|
| 3,511,031 | 5/1970 | Ketteringham et al. | 55/16 X |
| 3,516,791 | 6/1970 | Evans et al. | 423/449 |
| 3,814,642 | 6/1974 | Araki et al. | 423/449 X |
| 3,840,649 | 10/1974 | Feay et al. | 423/449 X |
| 4,032,430 | 6/1977 | Lewis | 423/447.1 X |
| 4,046,709 | 9/1977 | Yuki | 423/449 X |
| 4,175,153 | 11/1979 | Dobo et al. | 55/16 X |
| 4,261,832 | 4/1981 | Schumacher et al. | 55/16 X |
| 4,401,588 | 8/1983 | Turner | 423/447.1 X |
| 4,402,928 | 9/1983 | Lewis et al. | 423/447.1 |
| 4,424,145 | 1/1984 | Sara | 423/447.1 X |
| 4,439,349 | 3/1984 | Everett et al. | 423/449 X |

FOREIGN PATENT DOCUMENTS 118009 7/1982 Japan ................................ 423/449

Primary Examiner—Robert Spitzer
Attorney, Agent, or Firm—Fleit, Jacobson, Cohn & Price

[57] ABSTRACT

There are provided carbon membranes for use in separation processes. These have a very narrow range of pore sizes, with a very sharp cutoff at the upper pore size, and thus they are suited for the separation of various constituents which differ but little in their size. The membranes can be of a varied configuration: sheet form, tubular form, assymetrical membranes and the like. There is provided a process for the production of such membranes by controlled pyrolysis of a carbon containing percursor material.

11 Claims, 2 Drawing Figures

4,685,940

SEPARATION DEVICE

FIELD OF THE INVENTION

The invention relates to novel carbon membranes, to a process for their production and to separation devices for the separation of gaseous mixtures based on the use of such membranes. The invention further relates to a process for the separation of gases and to means for carrying out such process. Other and further aspects of the invention will become apparent hereinafter.

BACKGROUND OF THE INVENTION

The use of membranes for separation processes has been known for some tens of years. Such separation processes were based on the selective permeation of different moieties through thin membranes. In many of the systems the separation was due to the selectivity of permeation due to size differences of the various species in the mixture. The first processes were used for the separation of colloidal species and for the separation of other suspended small size particles from liquids. Amongst the first types of membranes there may be mentioned membranes with rather large and non-homogeneous pore diameter (>10 Å), which were satisfactory for the separation of mixtures with very large size differences of the species to be separated. A later development relates to reverse osmosis membranes used for the sweetening of brackish water. In parallel, ion exchange membranes were used for separation processes based on electrodialysis.

Amongst the important developments there may be mentioned the provision of hollow fiber membranes resulting in a very large overall membrane surface area in a small module, providing also the possibility of easy sealing of the edges of such modules.

A further development relates to the invention of the assymmetric membrane which comprises a coarse pore, thick support to which there is applied a very thin, dense and highly selective membrane, which thin membrane is used for the actual separation process, while the coarse support provides the required mechanical strength. Conventional processes for the separation of a certain gas or gases from gaseous mixtures are based on differences in chemical or physical properties, of the various constituents.

Cherical processes involve cyclic processes where certain chemicals are used for the removal of constituents. An example is the removal of hydrogen sulfide from natural gas. This may be effected by the iron sponge method where a reactor comprising a bed of finely divided iron is used in a single run, leaving iron sulfide wastes. Another process is the cyclic amine method where an organic ammonium salt is obtained during natural gas purification, which has to he thermally decomposed so as to recycle the amine. Amongst the most common physical separation methods are those based on fractional distillations. The most common is the separation of nitrogen and oxygen from air. On a large scale (about 1000 ton/day) the multistage cryogenic process is economical from an energy point of view. On a smaller scale other processes are more economical. There are also used adsorption processes based on the different adsorbability of various components of the gas mixture. Such process is advantageously effected as a multistage cyclic process in column configuration. After use, the adsorbent has to be regenerated for recycling, which can be effected at low pressure or by heating. Various separation processes are based on the use of specific zeolites or of carbon molecular sieves.

SUMMARY OF THE INVENTION

The invention relates to novel membranes and to their production. The membranes are carbon membranes, having a predetermined pore size, and they are useful as molecular sieves and can be used for various separation processes. Amongst the main uses of the novel carbon molecular sieve membranes is the separation of gaseous mixtures. It is one of the advantages that such separations can be carried out at elevated temperatures.

The invention further relates to a process for the production of such carbon membranes, in various geometrical configurations, such as sheet formed membranes and as hollow fibers.

According to preferred embodiments of the invention the membranes have pores of a predetermined narrow range of size. The size can be varied at will within certain limits, and for the separation of gaseous mixtures there are advantageously used membranes having a pore size of definite value, which can be varied in membranes for various purposes from about 2.5 Å to about 10 Å. The invention relates also to a process for the production of membranes having a specific pore size in the above range.

Membranes of flat configuration (in sheet form) are generally of a thickness of from about $1\mu$ to about $50\mu$, although purposes different thicknesses can be used. With assymetrical flat membranes the thickness of the .effective membrane can be even thinner than $1\mu$. When the membrane is used in the form of hollow fibers, the diameter will generally vary between $5\mu$ and 1 mm, with a wall thickness of from about $1\mu$ to about $300\mu$, according to the diameter.

The membranes of the present invention are produced by the controlled pyrolysis of a suitable carbon containing material which will neither melt nor decompose during pyrolysis. Suitable materials are cellulose and derivatives thereof, thermosetting polymers, certain acrylics, peach-tar mesophase etc. The pyrolysis can be effected on material having the configuration of the desired end-product. There can also be used other techniques, such as chemical vapor deposition (CVD), plasma deposition on a solid support, etc. The pyrolysis can be generally effected in a wide range of temperatures, between the decomposition temperature of the carbonaceous material and the graphitization temperature (about 3000° C.). Generally pyrolysis will be effected in the range of from 250° C. and 2500° C., a preferred range being 500° to 800° C.

The novel membranes are essentially free of pores larger than the ultramicropores required for the molecular sieving process. It was found that the higher the temperature used for the pyrolysis of the precursor, the smaller were the pores of the product, and thus the smaller the molecules which could permeate through such membranes. Activation by mild and well controlled oxidation steps provides the possibility to modify the pore size within certain limits. By the controlled size modification of the pores it is possible to obtain membranes of predetermined pore-size which are optimal for the separation of a mixture of two gases of different molecule size, even if these are quite close. This makes it possible to separate a mixture of two gases into the two components, or to separate a certain gaseous species from others which are either smaller or larger than the said species. The preparation and properties of the resulting membranes will be set in greater detail hereinafter.

Amongst the main advantages of the novel membranes there may be mentioned the possibility to use them at high temperatures, thus effecting gaseous separations at high temperatures, resulting in certain processes in considerable savings of energy. The separation can be effected at any desired temperature, up to temperatures where carbon membranes begin to deteriorate. For non-oxidizing gases, this temperature may be as high as 1000° C. A further advantage is the use of modules of the shell and tube type comprising a large number of hollow membrane fibers or tubelets, resulting in a large effective surface area per unit volume of such modules, and a high separation capacity. The novel membranes and separation devices based on such membranes can be used for a wide variety of separations, mainly of gaseous mixtures. Amongst possible uses there may be mentioned the separation of helium from natural gas; the separation of the system $H_2/CO_2/CO/CH_4$ resulting from coal gasification into its components; the separation of nitrogen from oxygen; and the like more.

The term "separation power" which is the product of permeability by selectivity, is indicative of the usefulness of the novel membranes compared with other separation processes. The Separation Power of the membranes of the invention is generally higher by at least one order of magnitude compared with that of conventional polymeric membranes. Furthermore, the use at high temperatures is highly advantageous. Membranes were tested continuously at 400° C. during one month and no deterioration was discernible.

The pyrolysis of suitable precursors, generally under conditions conventionally used for the production of carbon fibers, results in a product which has a certain microporosity of molecular dimensions which is responsible for the molecular sieve properties of the carbons. This is termed ultramicroporosity, and is assumed to be due to the chanelling out of small gaseous molecules of the material during pyrolysis. It seems that the micropores comprise about 30 to 70 percent of the volume of the carbon, and this seems to be in conformity with the apparent density of such carbonaceous materials (about 1.3 to 1.8 g/cm$^3$) compared with 2.2 g/cm$^3$ for graphite.

For the intended use it is advantageous to obtain membranes having a predetermined pore-size of 2.5 Å to 5.5 Å pore size, with pores of essentially uniform size. When the two molecules to be separated vary by as little as 0.2 Å, a stereoselectivity of 100:1 can be attained.

Various temperatures of pyrolysis were used, and it was found that the higher the temperature, the smaller the initial pore size of the resulting membrane. Subsequent controlled oxidation results in a pore opening, and thus predetermined pore size ranges can be obtained, suitable for the intended separation process. Assymetrical membranes can be prepared by the controlled pyrolysis of conventional assymetrical organic membranes having the required structure. Such membranes can also be produced by the deposition of a thin permselective carbon layer on a porous support, the deposition methods being any of the ones mentioned above. The following Examples illustrate the preparation of membranes of the invention and some of their uses.

EXAMPLE 1

A sheet of regenerated cellulose of 10 cm length, 2 cm width, and 10μ thickness, was pyrolyzed in an argon atmosphere during 12 hours by gradually raising temperatures up to 950° C. There was obtained a flat membrane which had a pore size of 2–2.5 Å, with a very sharp cutoff at the upper pore size of 2.5 Å as determined by low permeability to helium and hydrogen and undetectable permeability to nitrogen, methane and sulfur hexafluoride.

EXAMPLE 2

A cellulose hollow fiber membrane of 20 cm length, 160μ diameter and 10μ wall thickness was pyrolyzed during 12 hours by gradually raising temperatures up to 950° C. There was obtained a hollow carbon fiber membrane, having a pore size of 2–2.5 Å with a very sharp cutoff at the upper pore size, determined in the same manner as in Example 1.

EXAMPLE 3

A hollow fiber membrane was prepared starting with a 20 cm length cellulose hollow fiber of 160μ diameter and 10μ wall thickness which was pyrolyzed as described in Example 2, but the temperature was raised to 800° C. only. There was obtained a carbon hollow fiber, having a pore size of 2.5–3 Å, with a sharp cutoff at the 3 Å limit, as determined by high permeability to helium and hydrogen and negligible permeability to nitrogen and methane.

EXAMPLE 4

An assymetric carbon membrane was prepared as follows:

A commercial assymetric polymer membrane was pyrolyzed during 12 hours by raising temperatures up to 800° C. The thus obtained membrane behaved in a manner similar to that of Example 3.

EXAMPLE 5

A carbon membrane was prepared by chemical vapor deposition of various organic gases at 900° C. over a porous graphite tube. The carbon membrane obtained had permeation properties similar to those of Example 3.

EXAMPLE 6

A carbon membrane was prepared by plasma deposition as follows:

A mixture of organic gases: ethane, ethylene, propane, benzene, diluted with inert gases such as Argon, were passed through an electric discharge zone at reduced pressures. Within the electric discharge zone was placed a specimen of porous graphite. This was thus coated by a thin carbon aembrane layer, which exhibited gas permeation properties similar to those of Example 2.

EXAMPLE 7

A membrane obtained according to Example 2 was treated as follows in order to obtain an increased pore size:

There was passed through the hollow fiber a stream of air at 400° C. during 15 minutes. Determination of pore size after this treatment showed that the pore size had thereby been increased from 2.5 Å to 3.6 Å. The result of this pore enlargement was demonstrated by the permeabilities of experiments 6-9 in Table 1, where oxygen (3.28 Å) is as permeabie as helium and much more than nitrogen and sulfur hexafluoride.

EXAMPLE 8

A membrane obtained according to Example 7 was evacuated at 700° C. The result of this pore enlargement was a selectivity of 10 between nitrogen and methane, the critical dimensions of which being 3.6 Å and 4.0 Å respectively.

EXAMPLE 9

A membrane obtained according to Example 3 was evacuated at 700° C. Determination of pore size after this treatment showed that the pore size had thereby been increased from 3 Å to 3.3 Å with a very sharp cutoff at the upper limit of 3.3 Å. The result of this pore enlargement was a selectivity of 10 between carbon dioxide and oxygen, the critical dimensions being 3.1 Å and 3.28 Å respectively. Thus a very sharp cutoff of pore size is repeatedly demonstrated.

Experiments have shown that heating carbon membranes at a temperature above 700° C. results in a certain decrease of pore size, increasing the selectivity at the expense of a decrease of permeability. The heating is effected under an inert atmosphere, such as nitrogen or noble gas.

Carefully controlled oxidation (by means of oxygen, oxygen admixed with other gases, air) at elevated temperatures results in a gradual increase of pore size.

Similarly there may be used other oxidizing agents in gaseous form, which react with carbon at elevated temperatures. Amongst these may be mentioned steam, carbon dioxide, nitrogen oxides and chlorine oxides.

There may also be used solutions of oxidizing agents in order to increase the pore size. Amongst these there may be mentioned nitric acid, mixtures of nitric and sulfuric acid, chromic acid and peroxide solutions. After such treatments the membrane is degassed at elevated temperatures.

It is possible to resort to electrochemical treatments, such as anodic oxidation of the membrane to increase the pore size. Plasmas may be used in order to obtain pore openings or pore closure (decrease of pore size), depending on the type of plasma used and the conditions of the treatment.

The selectivity of carbon membranes may be increased by the introduction of organic species into the pore system of the carbon membrane and pyrolyzation of same thereafter. Amongst organic molecules which may be used for this purpose there may be mentioned large and nonvolatile organic molecules such as: ethene, propane, ethylene, benzene, other hydrocarbons etc.

The measurements on individual hollow fiber carbon membranes of the invention were carried out with measurement systems illustrated in the enclosed schematical drawings, which are not according to scale, and in which.

Figure 1:
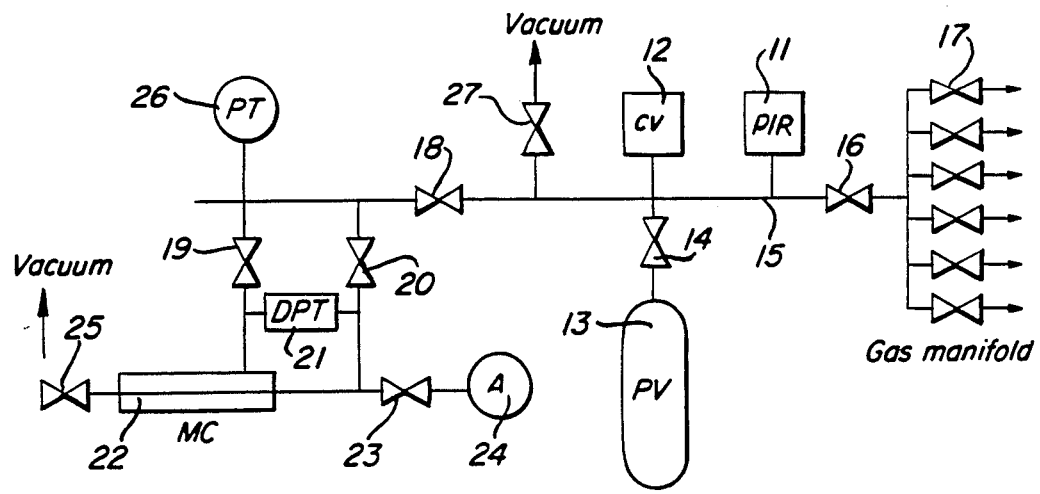
FIG. 1 illustrates a permeability measurement system.

As illustrated in FIG. 1 a permeability measurement system used for evaluating tubular membranes of the invention comprises in combination a Piranni gauge 11, check valve 12, pressurizing vessel 13, connected via valve 14 to main conduit 15, which is connected via valve 16 to gas manifold 17 and via valve 18 and valves 19 and 20, to differential pressure transducer 21, to membrane cell 22 which is connected also via valve 23 to calibrated volume container 24, there being provided a connection to a vacuum source via valve 25, and an absolute pressure transducer 26, and a connection to vacuum via valve 27.

The system is suited for working with pure gases at stationary conditions. The pressures ranged from moderate vacuum ($10^{-2}$ torr), necessary for pore development at high temperatures, up to 10 atmospheres. Gas pressures were generated by means of the pressure regulators of the gas cylinders. They could be increased further by introducing the gas into the pressurising vessel 13 while cooled to 77 K, closing valve 16 and heating the vessel 13 back to room temperature.

The permeability measurement was carried out by creating a pressure difference across the membrane and monitoring its decay with time. The gas volumes $V_1$ and $V_2$ on both sides of the membrane were calibrated utilizing the pressure transducers and the calibrated volume A of 24. Assuming that the ideal gas law is valid, the rate of transport dv/dt (in $Cm^3NTP$) is given by;

$$\frac{dv}{dt} = \frac{V_1 V_2}{RT(V_1 + V_2)} \frac{d(\Delta p)}{dt} \quad (1)$$

where $d(\Delta p)/dt$ is the rate of decrease of the pressure difference $P_1 - P_2$ across the membrane $V_1$, $V_2$ are gas volumes on both sides of the membrane. Utilizing the permeability equation:

$$P = \frac{dv}{dt} \frac{1}{A \Delta p} \quad (2)$$

where A is the surface area and 1 the thickness of the membrane, one obtains:

$$P = \frac{V_1 V_2}{RT(V_1 + V_2)} \frac{1}{A \Delta p} \frac{d(\Delta p)}{dt} \quad (3)$$

from which the permeability may be determined experimentally. The procedure of a permeability experiment was as follows: a certain gas pressure p was introduced through valve 18 to both sides of the membrane. Valve 19 was then shut off and the pressure at $V_1$ was decreased back through valve 18 and 27 to the desired value. Valve $V_1$ was then shut off and the rate dp/dt was recorded by means of the differential pressure transducer 21 (DPF). The rate of transport was obtained by means of equation (1).

Figure 2:
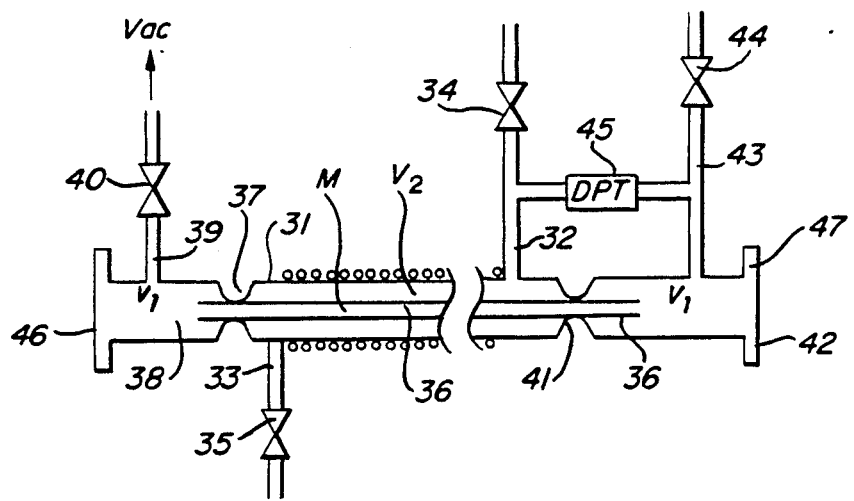
FIG. 2 illustrates a membrane cell for determining the characteristics of membranes of the invention.

The membrane cell illustrated in FIG. 2 comprises in combination a tubular shell with cell walls 31, provided with an inlet 32 and an outlet 33, which are provided with valves 34 and 35 respectively. In said tubular member 31 there is provided the hollow fiber carbon membrane 36, said tubular member 31 being surrounded by adjustable heating elements 37, said tubular member 31 extending beyond seal 37 to a left hand section 38, defining a volume $V_1$, and provided with exit conduit 39 with valve 40, while the right hand section is separated by seal 41 to right hand section 42, defining a volume $V_2$, which volume is provided with conduit 43 and valve 44, said conduit 43 being also connected with conduit 32 via differential pressure transducer 45, said left and right hand sections terminating in flanges 46 and 47, respectively.

TABLE 1

Permeabilities and selectivities* of the 950° C. pyrolyzed membrane.

| Experiment No. | gas | permeability $(cm^3 \cdot cm^{-2} \cdot cm \cdot S^{-1} cmHg^{-1}) \times 10^8$ | Selectivity | activation mode |
|---|---|---|---|---|
| 1 | He,O$_2$,N$_2$,SF$_6$ | <0.3 | | no activation |
| 2 | He | 6-12 | | Stationary activation |
| | | | >20 | |
| 3-5 | O$_2$,N$_2$,SF$_6$ | <0.3 | | first step |
| 6 | He | 9.1 | | |
| | | | 0.8 | dynamic |
| 7 | O$_2$ | 11.4 | | activation |
| | | | 8.0 | first step |
| 8 | N$_2$ | 1.4 | | |
| 9 | SF$_6$ | <0.3 | | |
| 10 | SF$_6$ | 115 | | dynamic |
| | | | $0.19 \simeq \frac{\sqrt{M_1}}{M_2}$ | activation |
| 11 | He | 650 | | |
| | | | $2.8 \simeq \frac{\sqrt{M_1}}{M_2}$ | |
| 12 | O$_2$ | 228 | | second step |
| | | | $0.92 \simeq \frac{\sqrt{M_1}}{M_2}$ | |
| 13 | N$_2$ | 248 | | |

*The selectivity is the permeability ratio of the gases shown above and below the given value.

TABLE 2

Permeability and selectivity of the 800° C. pyrolyzed membrane.

| Experiment No. | gas | permeability $(cm^3 \cdot cm^{-2} \cdot cm \cdot S^{-1} cmHg^{-1}) \times 10^8$ | selectivity | activation mode |
|---|---|---|---|---|
| 1 | He | 10.8 | | |
| | | | 4.0 | non |
| 2 | Co$_2$ | 2.7 | | activated |
| | | | >9 | |
| 3 | O$_2$, N$_2$, SF$_6$ | <0.3 | | |
| 4 | O$_2$ | 2.3 | | stationary |
| | | | >8 | 1$^{st}$ step |
| 5 | N$_2$ | <0.3 | | |
| 6 | He | 52 | | |
| | | | 3.0 | stationary |
| 7 | O$_2$ | 17.1 | | |
| | | | 7.1 | 2$^{nd}$ step |
| 8 | N$_2$ | 2.4 | | |
| | | | >24 | |
| 9 | SF$_6$ | <0.1 | | |
| 10 | He | 44 | | |
| | | | 1.1 | degassing |
| 11 | N$_2$ | 39 | | at 600° C. |
| | | | 2.3 | |
| 12 | O$_2$ | 91 | | |

TABLE 3

Permeability, selectivity and separation power of various polymer membrane and of the MSC membrane

| membrane | gas | permeability $(cm^3 \cdot cm^{-2} \cdot cm \cdot S^{-1} cmHg^{-1}) \times 10^8$ | selectivity | separation power | reference |
|---|---|---|---|---|---|
| Cellulose acetate | He | 0.136 | | | |
| | | | 97 | 13.2 | 17 |
| | N$_2$ | 0.0014 | | | |
| Poly-sulfone | H$_2$ | 0.12 | | | |
| | | | 40 | 4.8 | 18 |
| | CO | 0.003 | | | |
| Silicon rubber | H$_2$ | 5.2 | | | |
| | | | 2.08 | 10.8 | 18 |
| | CO | 2.5 | | | |
| | He | 2.3 | | | |
| | | | 1.5 | 3.5 | 19 |
| | N$_2$ | 1.5 | | | |
| | O$_2$ | 3.96 | | | |
| | | | 2.15 | 8.3 | 14 |
| | N$_2$ | 1.84 | | | |
| Du-Pont, unspecified material | H$_2$ | 2.7-1.2 | | | |
| | | | 130-57 | 350-69 | 20 |
| | N$_2$ | 0.02 | | | |
| MSC membrane | O$_2$ | 17.1 | | | |
| | | | 7.1 | 124 | |
| | N$_2$ | 2.4 | | | |
| | He | 52 | | | |
| | | | 22 | 1140 | |
| | N$_2$ | 2.4 | | | |
| | He | 52 | | | |
| | | | 3.04 | 160 | |
| | O$_2$ | 17.1 | | | |
| | He | 6 | | | |
| | | | >20 | >120 | |
| | O$_2$ | <0.3 | | | |
| | N$_2$ | 2.4 | | | |
| | | | >24 | >58 | |
| | SF$_6$ | <0.1 | | | |

| Molecular dimensions as estimated by liquid molar volume | | |
|---|---|---|
| Molecule | Average diameter (A) | shaped corrected width* (critical diameter in Å) |
| CO$_2$ | 4.53 | 3.1 |
| O$_2$ | 4.0 | 3.28 |
| H$_2$ | 4.06 | 3.44 |

-continued

| Molecular dimensions as estimated by liquid molar volume | | |
|---|---|---|
| Molecule | Average diameter (Å) | shaped corrected width* (critical diameter in Å) |
| $N_2$ | 3.85 | 3.59 |
| Ar | 4.06 | 3.6 |
| $CH_4$ | 4.49 | 4.0 |
| $SF_6$ | 5.63 | 5.02 |

*J. Chem. Soc. Faraday I 76 2472-85 (1980)

It is a very important feature of the membranes of the present invention that they have a very sharp cut-off of pore size at any given size range of pores. It must be understood that only such a sharp upper cut-off of pore size makes it possible to effect a separation of gaseous species which differ but little in their size.

The membranes of the invention make it possible to separate gaseous species which differ by only about 0.20 Å from each other. This is a clear proof of the sharp upper cut-off or pore size: if the pores would differ by more than 0.20 Å, the larger gaseous species would pass through the membrane together with the smaller one.

Experiments have shown that it is possible to obtain such a sharp cut-off at the upper limit of the pore size range with membranes of different pore size, thus making it possible to separate efficiently gaseous species which differ by only about 5–10 percent in their critical sizes (see examples 7–9).,

We claim:

1. A carbon membrane for separating two gases having different size molecules in a range of 2.5 Å to 5.0 Å, wherein the molecules of each gas differ from one another in size by an amount not greater than 10%, said membrane having pores of a preselected size which also is in the range of 2.5 Å to 5.0 Å and which is intermediate the molecule sizes of the two gases to be separated, and said membrane having a pore size distribution which is such that the membrane has no significant number of pores which are 10% or greater in size than the smaller of the molecule sizes of the two gases.

2. A carbon membrane according to claim 1, wherein the membrane is in sheet form and of from 1µ to 300µ thickness.

3. Carbon membranes according to claim 1, in the form of tubular fibers, of from 5µ to 1 mm diameter and with a wall thickness of 1µ to 300µ, depending on the diameter, of desired length.

4. A separation module of the shell and tube type comprising a plurality of hollow carbon fibers as claimed in claim 3.

5. A carbon membrane according to claim 1, wherein the carbon membrane is of assymetrical construction, and the active carbon membrane is 50µ to 300µ in thickness and supported by a porous support of adequate mechanical strength.

6. A separation module for the separation of gaseous mixtures comprising a plurallity of assymmetrical carbon membranes according to claim 5, in a membrane stack configuration.

7. A carbon membrane according to claim 1, wherein the carbon membrane is the product of pyrolysis of a carbon containing precursor at a temperature of from 250° C. to 2500° C.

8. A carbon membrane according to claim 1, wherein the carbon membrane is the product of pyrolysis of a suitable precursor and subsequent pore size manipulation by heat treatment or by controlled oxidation.

9. A process for the production of a carbon membrane for a separation process as claimed in claim 1, which comprises pyrolyzing under an inert atmosphere a mechanically heat stable carbon containing precursor material having the configuration of the final product.

10. A process according to claim 9 wherein the pyrolysis is effected at a temperature between 250° C. and 2500° C.

11. A process according to claim 9, wherein the precursor is cellulose, a cellulose derivative, a thermosetting polymer or peach tar mesophase having the configuration of the desired product, with the pore size range of the precursor being determined by the temperature of pyrolysis and being in the range of 2.5 Å to 5.0 Å.

* * * * *